(12) United States Patent
Criswell

(10) Patent No.: US 11,261,038 B2
(45) Date of Patent: Mar. 1, 2022

(54) SYSTEM AND METHOD FOR AUTOMATED TRUCK LOADING

(71) Applicant: Wynright Corporation, Hobart, IN (US)

(72) Inventor: Tim Criswell, Grand Prairie, TX (US)

(73) Assignees: Wynright Corporation, Hobart, IN (US); Daifuku Co., LTD., Osaka (JP)

( * ) Notice: Subject to any disclaimer, the term of this patent is extended or adjusted under 35 U.S.C. 154(b) by 0 days.

(21) Appl. No.: 17/135,004

(22) Filed: Dec. 28, 2020

(65) Prior Publication Data

US 2021/0114823 A1   Apr. 22, 2021

Related U.S. Application Data

(63) Continuation of application No. 16/505,407, filed on Jul. 8, 2019, now Pat. No. 10,875,727, which is a continuation of application No. 15/640,022, filed on Jun. 30, 2017, now Pat. No. 10,343,855, which is a continuation of application No. 14/854,714, filed on Sep. 15, 2015, now Pat. No. 9,694,994, which is a
(Continued)

(51) Int. Cl.
*B65G 47/90* (2006.01)
*B25J 9/00* (2006.01)

(52) U.S. Cl.
CPC .......... *B65G 47/905* (2013.01); *B25J 9/0093* (2013.01); *B65G 47/902* (2013.01)

(58) Field of Classification Search
CPC ........ B65G 67/02; B65G 67/04; B65G 67/08; B65G 67/10; B65G 67/20; B65G 67/24; B65G 47/901; B65G 47/902; B65G 47/904; B65G 47/905; B25J 9/0093; B25J 5/005; B25J 19/02; B25J 19/021; B25J 19/023; B25J 19/022

See application file for complete search history.

(56) References Cited

U.S. PATENT DOCUMENTS 3,356,236 A   12/1967 Shaw et al.
3,717,263 A   2/1973 McWilliams
(Continued)

OTHER PUBLICATIONS

International Search Report, PCT/US2008/006663, dated Sep. 8, 2008.
(Continued)

*Primary Examiner* — Glenn F Myers
(74) *Attorney, Agent, or Firm* — Scott T. Griggs; Griggs Bergen LLP

(57) ABSTRACT

An automatic case loader for loading product in a trailer is disclosed. A mobile base structure provides a support framework for a drive subassembly, conveyance subassembly, an industrial robot, a distance measurement sensor, and a control subassembly. Under the operation of the control subassembly, product advances through a powered transportation path to an industrial robot which places the product within the trailer. The control subassembly coordinates the selective articulated movement of the industrial robot and the activation of the drive subassembly based upon the distance measurement sensor detecting objects within a detection space, dimensions of the trailer provided to the control subassembly, and dimensions of the product provided to the control subassembly.

21 Claims, 13 Drawing Sheets

Related U.S. Application Data continuation of application No. 14/060,419, filed on Oct. 22, 2013, now Pat. No. 9,132,975, which is a continuation of application No. 12/126,463, filed on May 23, 2008, now Pat. No. 8,562,277.

(60) Provisional application No. 60/939,689, filed on May 23, 2007.

(56) References Cited

U.S. PATENT DOCUMENTS

| | | |
|---|---|---|
| 3,756,431 A | 9/1973 | Evans et al. |
| 3,853,230 A | 12/1974 | Schultz |
| 3,931,897 A | 1/1976 | Bacon et al. |
| 3,939,994 A | 2/1976 | Suzzi |
| 4,585,384 A | 4/1986 | Richard et al. |
| 4,636,137 A | 1/1987 | Lemelson |
| 4,643,629 A | 2/1987 | Takahashi et al. |
| 4,680,519 A | 7/1987 | Chand et al. |
| 5,002,457 A | 3/1991 | Dorner et al. |
| 5,015,145 A * | 5/1991 | Angell .......... B65G 61/00 414/391 |
| 5,069,592 A | 12/1991 | Galperin |
| 5,087,169 A | 2/1992 | Tubke |
| 5,125,298 A | 6/1992 | Smith |
| 5,256,021 A * | 10/1993 | Wolf .......... B65G 67/08 198/308.1 |
| 5,325,953 A | 7/1994 | Doster et al. |
| 5,326,218 A | 7/1994 | Fallas |
| 5,366,024 A | 11/1994 | Payne |
| 5,426,921 A | 6/1995 | Beckmann |
| 5,455,669 A | 10/1995 | Wetteborn |
| 5,685,416 A | 11/1997 | Bonnet |
| 5,908,283 A | 6/1999 | Huang et al. |
| 6,115,128 A | 9/2000 | Vann |
| 6,350,098 B1 | 2/2002 | Christenson et al. |
| 6,522,951 B2 | 2/2003 | Born et al. |
| 6,562,277 B1 | 5/2003 | Schrock |
| 6,571,532 B1 | 6/2003 | Wiernicki et al. |
| 6,591,593 B1 | 7/2003 | Brandon et al. |
| 6,609,719 B2 | 8/2003 | Helen |
| 6,612,011 B2 | 9/2003 | Mayr et al. |
| 6,659,263 B2 | 12/2003 | Hendrickson et al. |
| 6,662,931 B2 | 12/2003 | Bruun et al. |
| 6,699,007 B2 | 3/2004 | Huang et al. |
| 6,869,267 B2 | 3/2005 | Pfeiffer et al. |
| 6,874,615 B2 | 4/2005 | Fallas |
| 6,896,474 B2 | 5/2005 | Guidetti |
| 6,974,928 B2 | 12/2005 | Bloom |
| 7,047,710 B2 | 5/2006 | Winkler |
| 7,967,543 B2 | 6/2011 | Criswell et al. |
| 9,694,994 B2 | 7/2017 | Criswell |
| 10,343,855 B2 | 7/2019 | Criswell |
| 2001/0026755 A1 | 10/2001 | Wood et al. |
| 2004/0069854 A1 | 4/2004 | Good et al. |
| 2005/0047895 A1 | 3/2005 | Lert |
| 2005/0105990 A1 | 5/2005 | Maclay |
| 2005/0128060 A1 | 6/2005 | Rennick et al. |
| 2005/0135912 A1 | 6/2005 | Schempf et al. |
| 2005/0278193 A1 | 12/2005 | Kibbler |
| 2006/0016610 A1 * | 1/2006 | Pohlman .......... A01G 20/15 172/20 |
| 2011/0139576 A1 | 6/2011 | Johannsen |

OTHER PUBLICATIONS

International Search Report, PCT/US2008/006624, dated Sep. 25, 2008.

* cited by examiner

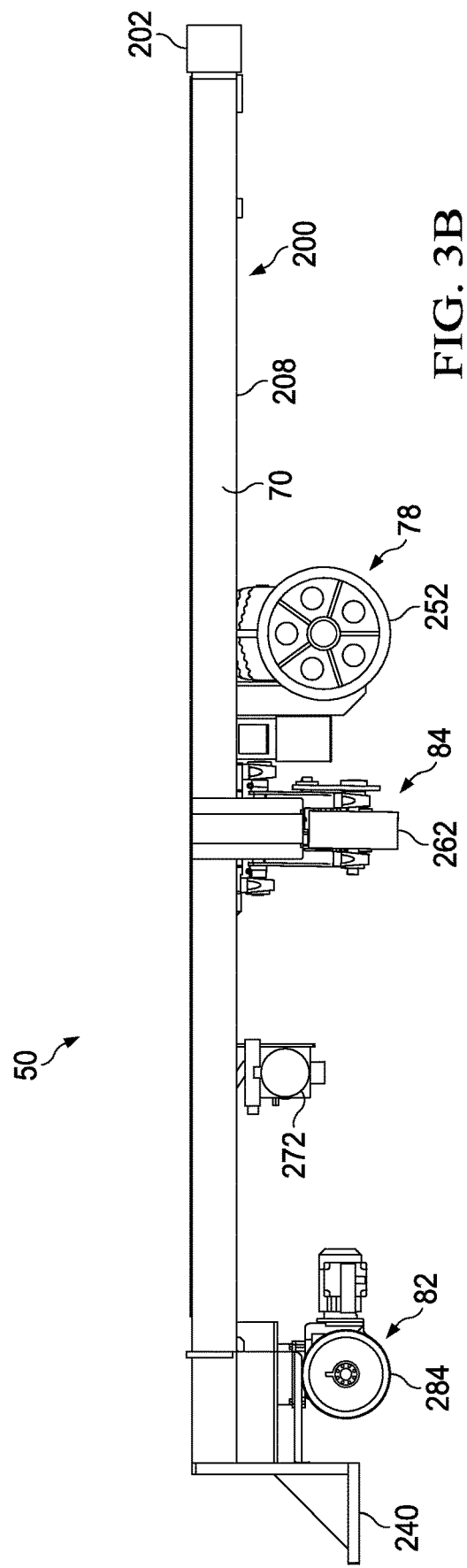

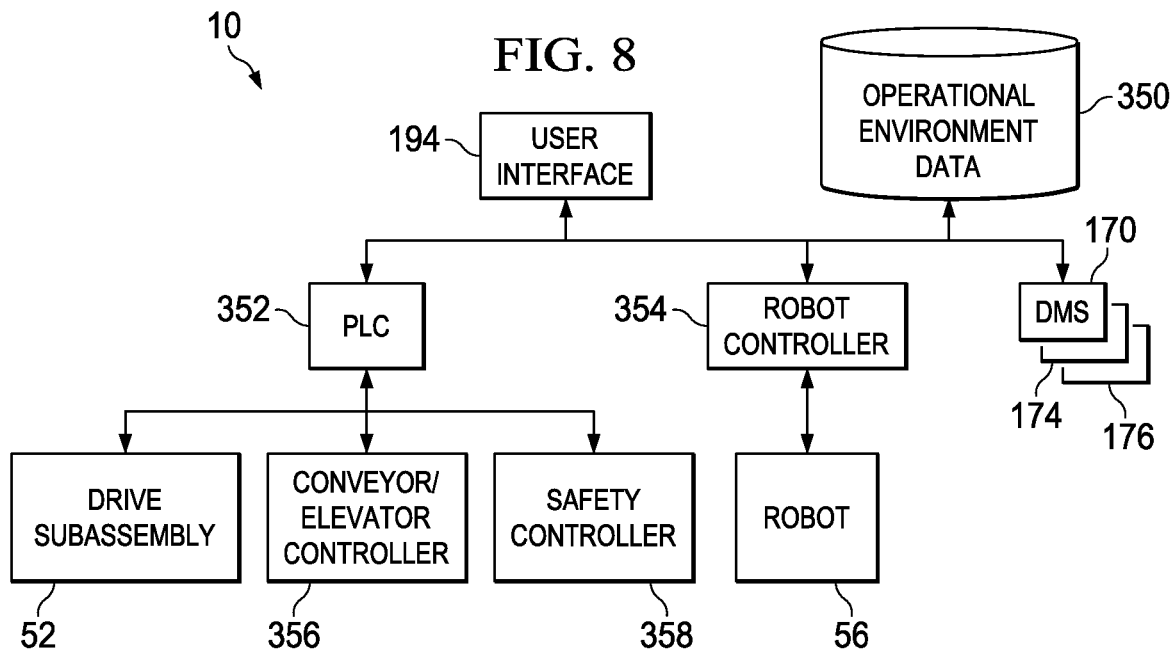
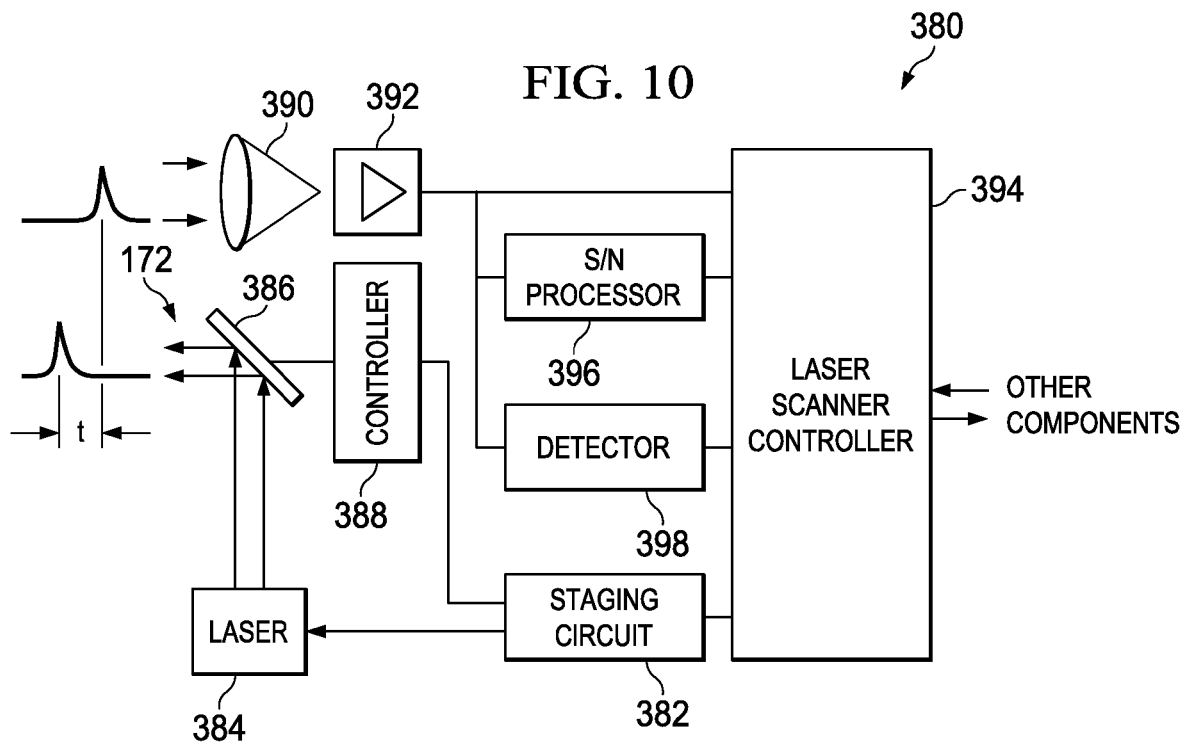

SYSTEM AND METHOD FOR AUTOMATED TRUCK LOADING

PRIORITY STATEMENT & CROSS-REFERENCE TO RELATED APPLICATIONS

This application is a continuation of U.S. application Ser. No. 16/505,407 entitled, "System and Method for Automated Truck Loading" filed on Jul. 8, 2019 in the name of Tim Criswell, now U.S. Pat. No. 10,875,727 issued on Dec. 29, 2020; which is a continuation of co-pending U.S. patent application Ser. No. 15/640,022 entitled "System and Method for Automated Truck Loading" filed on Jun. 30, 2017, in the name of Tim Criswell, now U.S. Pat. No. 10,343,855, issued on Jul. 9, 2019; which is a continuation of U.S. patent application Ser. No. 14/854,714 entitled "System and Method for Automated Truck Loading" filed on Sep. 15, 2015, in the name of Tim Criswell, now U.S. Pat. No. 9,694,994, issued on Jul. 4, 2017; which is a continuation of U.S. patent application Ser. No. 14/060,419 entitled "System and Method for Automated Truck Loading" filed on Oct. 22, 2013, in the name of Tim Criswell, now U.S. Pat. No. 9,132,975, issued on Sep. 15, 2015; which is a continuation of U.S. patent application Ser. No. 12/126,463 entitled "System and Method for Automated Truck Loading" filed on May 23, 2008, in the name of Tim Criswell, now U.S. Pat. No. 8,562,277, issued on Oct. 22, 2013; which claims priority from U.S. Patent Application Ser. No. 60/939,689 entitled "System and Method for Automated Truck Loading" and filed on May 23, 2007, in the name of Tim Criswell; all of which are hereby incorporated by reference, in entirety, for all purposes.

TECHNICAL FIELD OF THE INVENTION

This invention relates, in general, to a machine for handling products and, more particularly, to a system and method for automated truck loading which employ an automatic case loader designed to stack product, such as standard cardboard cases of various heights and widths, within a trailer.

BACKGROUND OF THE INVENTION

Loading docks and loading bays are commonly found in large commercial and industrial buildings and provide arrival and departure points for large shipments brought to or taken away by trucks and vans. By way of example, a truck may back into a loading bay such that the bumpers of the loading bay contact the bumpers on the trailer and a gap is created between the loading bay and the truck. A dock leveler or dock plate bridges the gap between the truck and a warehouse to provide a fixed and substantially level surface. Power moving equipment, such as forklifts or conveyor belts, is then utilized to transport the cargo from the warehouse to the truck. Human labor is then employed to stack the cargo in the truck. These systems are designed to maximize the amount the cargo loaded while minimizing the use of human labor to both protect and extend the life of the workforce. A need still exists, however, for improved truck loading systems that further reduce the use of human labor.

SUMMARY OF THE INVENTION

An automatic case loader for loading product in a trailer is disclosed. A mobile base structure provides a support framework for a drive subassembly, conveyance subassembly, an industrial robot, a distance measurement sensor, and a control subassembly. Under the operation of the control subassembly, product advances through a powered transportation path to an industrial robot which places the product within the trailer. The control subassembly coordinates the selective articulated movement of the industrial robot and the activation of the drive subassembly based upon the distance measurement sensor detecting objects within a detection space, dimensions of the trailer provided to the control subassembly, and dimensions of the product provided to the control subassembly. These systems and methodologies utilizing the present automatic case loader therefore maximize the amount the product and cargo loaded while minimizing the use of human labor to both protect and extend the life of the workforce.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 3B is a side elevation view of the mobile base illustrated in FIG. 3A;

FIG. 8 is a schematic diagram of one embodiment of the automatic case loader;

FIG. 10 is a schematic diagram of one embodiment of a distance measurement sensor which forms a component of the automatic case loader.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
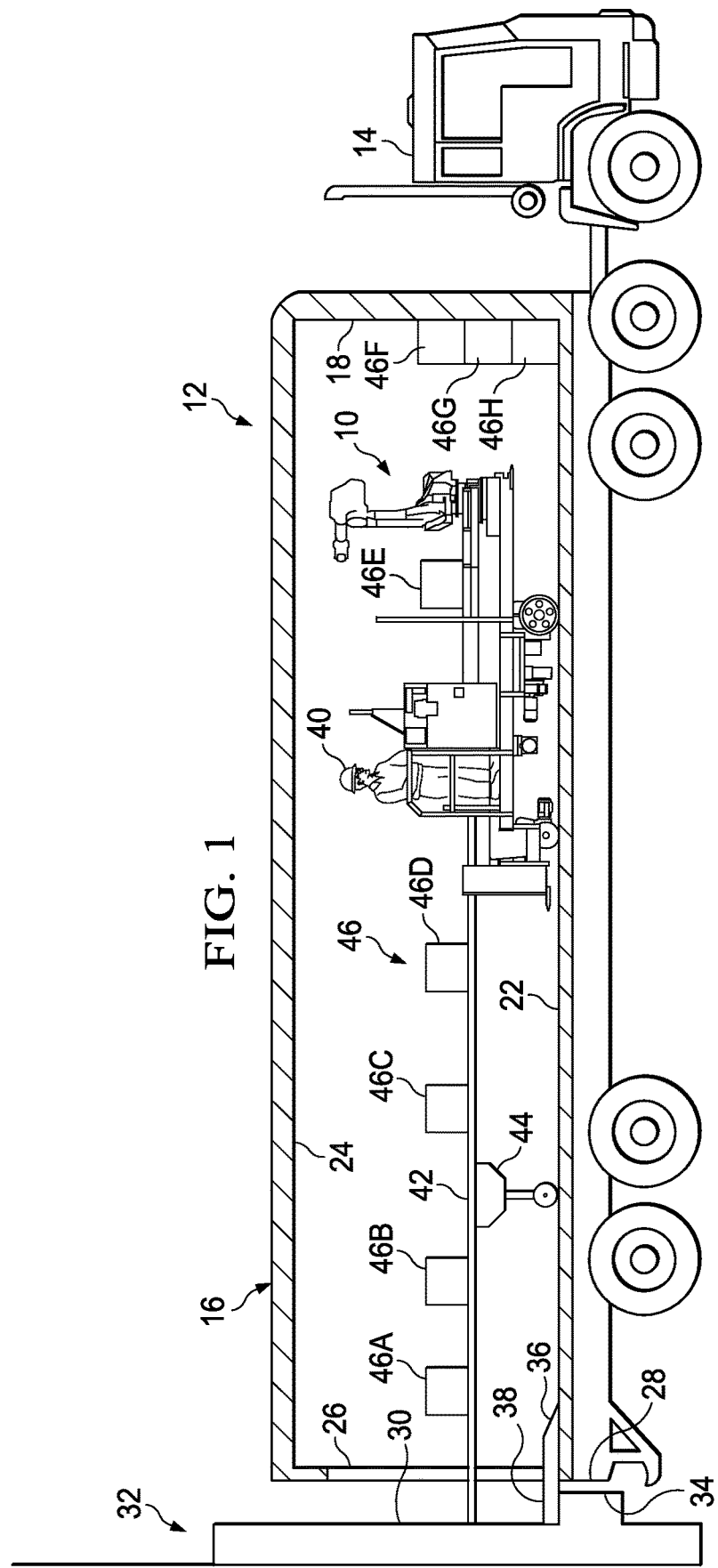
FIG. 1 is a side elevational view with partial cross-section of one embodiment of an automatic case loader positioning product depicted as cases of various heights and widths within a trailer.

Referring initially to FIG. 1, therein is depicted an automatic case loader that is schematically illustrated and generally designated 10. This automatic case loader 10 is utilized in systems and methods for automated truck loading. A tractor trailer 12 having an operator cab 14 is towing a trailer 16 having a front wall 18, two side walls 20A, 20B (best seen in FIGS. 7A through 7H), a floor 22, a ceiling 24, and a rear access opening 26 accessible due to an open door. A bumper 28 of the trailer 16 is backed up to a loading bay 30 of loading dock 32 such that the bumper 28 touches a bumper 34 of the loading bay 30. A dock plate 36 bridges the gap between the floor 22 and a deck 38 of the loading dock 32.

As will be described in further detail hereinbelow, under the supervision of distance measurement sensors that are components of the automatic case loader 10, the automatic case loader 10 maneuvers and drives automatically into the trailer 16 to a position proximate to the front wall 18. It should be appreciated that although an operator 40 is depicted as operating the automatic case loader 10, an operator is unnecessary. The automatic case loader 10 operates independently of the operator 40 and the operator 40 is only necessary for certain types of troubleshooting, maintenance, and the like. A telescoping conveyor unit 42 having a skate wheel 44 for support and balance is connected to the automatic case loader 10. A stream of product 46, in the form standard cardboard cases 46A-46H of various heights and widths, is being supplied by the telescoping conveyor 42 which, in turn, loads the product 46 into the trailer 16. In particular, the automatic case loader 10 has already stacked cases 46F, 46G, 46H at the intersection of the front wall 18 and the floor 22. The automatic case loader 10 alternates between loading the product 46 and reversing to create more space for the product 46 between the front wall 18 and the automatic case loader 10 until the trailer 16 is at least partially loaded of product 46.

Figure 2A:
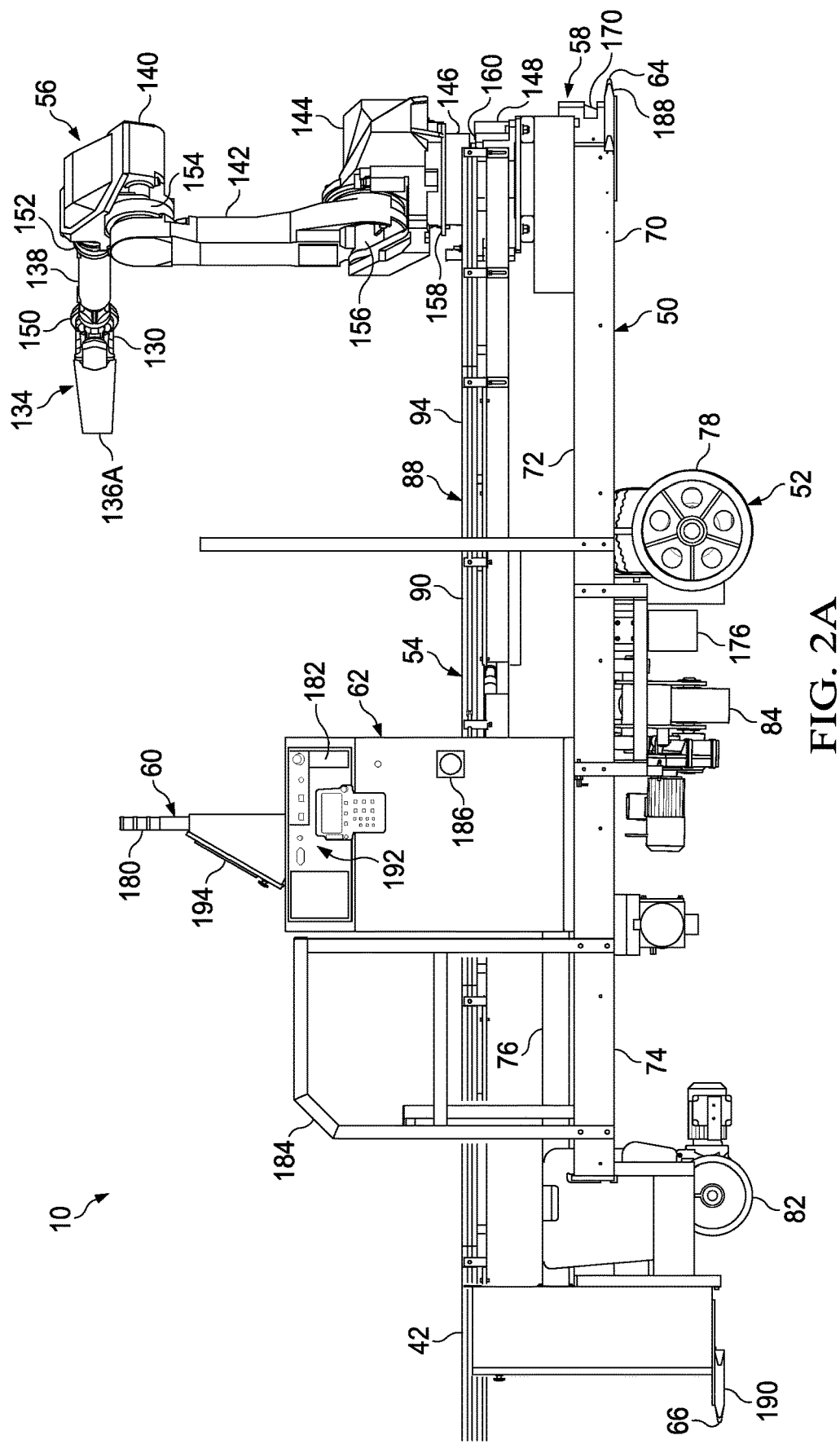
FIG. 2A is a side elevational view of the automatic case loader illustrated in FIG. 1.
Figure 2B:
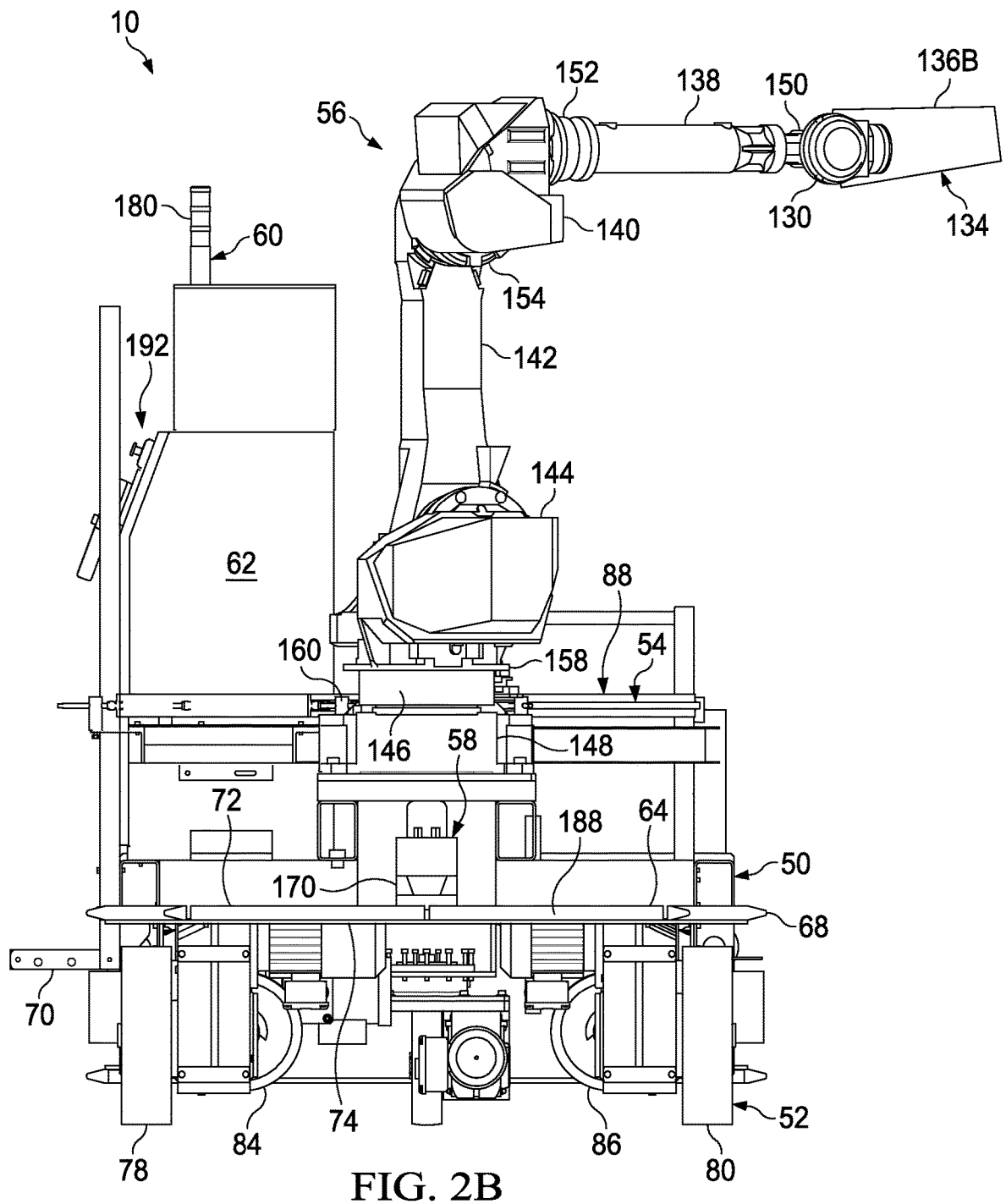
FIG. 2B is a front elevation view of the automatic case loader illustrated in FIG. 1.
Figure 2C:
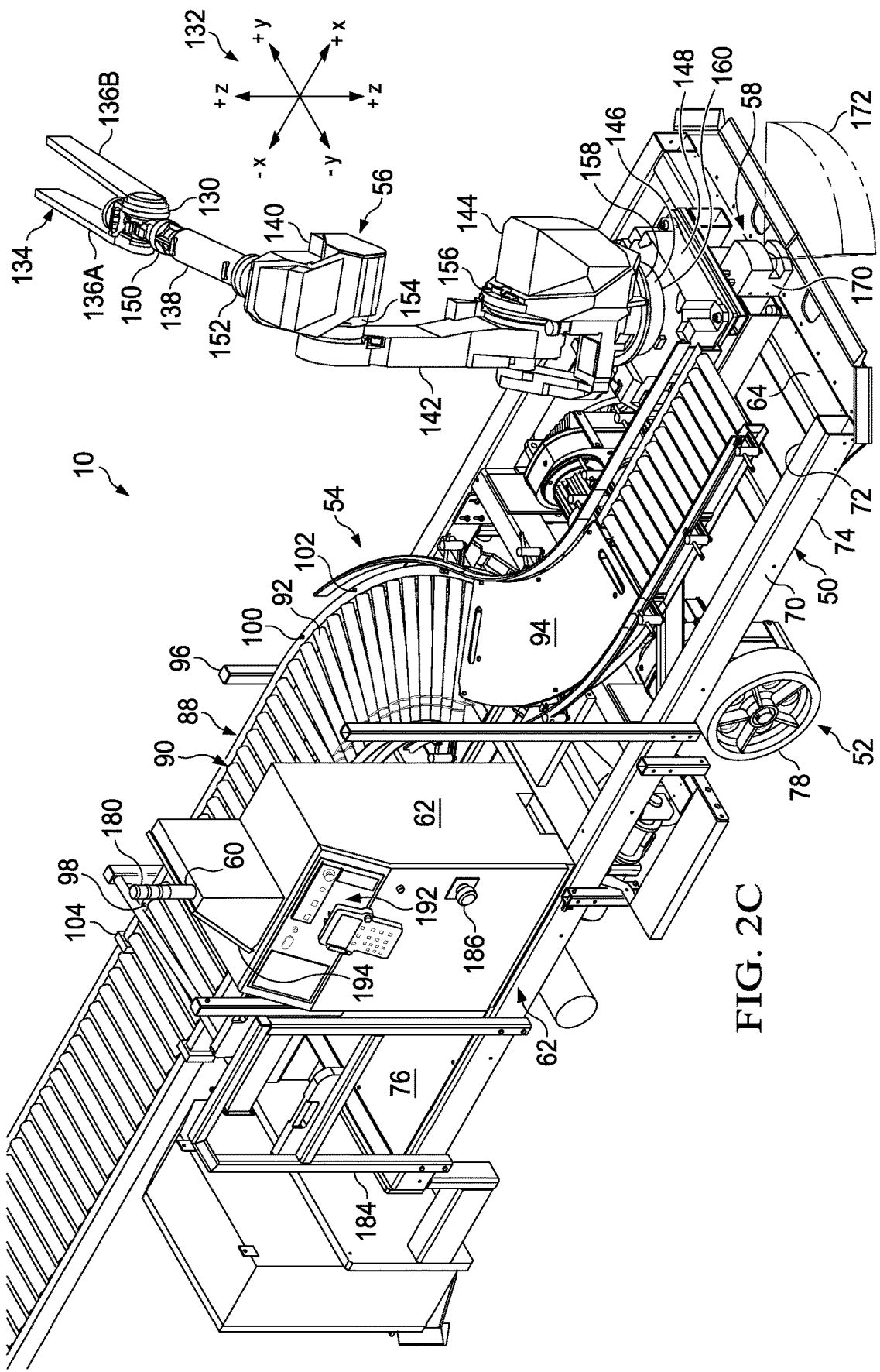
FIG. 2C is a front perspective view of the automatic case loader illustrated in FIG. 1.

FIG. 2A through FIG. 2C depict the automatic case loader 10 in further detail. A mobile base 50 supports a drive subassembly 52, a conveyance subassembly 54, an industrial robot 56, a positioning subassembly 58, a safety subsystem 60, and a control subassembly 62, which interconnects the drive subassembly 52, conveyance subassembly 54, industrial robot 56, positioning subassembly 58, and safety subsystem 60. The mobile base 50 includes a front end 64 and a rear end 66 as well as sides 68, 70, a surface 72, and an undercarriage 74. An operator platform 76 is positioned proximate to the rear end 66 and the side 68 to be adapted to safely accommodate the operator 40.

The drive subassembly 52 is coupled to the undercarriage 74 of the mobile base 50 to provide mobility. As will be discussed in further detail hereinbelow, drive wheel assemblies 78, 80, are disposed on the undercarriage 74 proximate to the sides 70, 68 respectively. A universal wheel assembly 82 is disposed on the undercarriage 74 more proximate to the rear end 66 and centered between the sides 68, 70, respectively. In combination, wheel assemblies 78, 80, 82 provide forward and reverse drive and steering. Retractable wheel assemblies 84, 86 are also disposed on the undercarriage 74 proximate to the sides 70, 68, respectively. The retractable wheel assemblies 84, 86 have an orientation which is orthogonal to the retractable wheel assemblies 78, 80 to, in conjunction with the universal wheel assembly 82, provide transverse drive and steering. As alluded to, in a forward or reverse drive and steering operation, such as moving into or out of the trailer 16, drive wheel assemblies 78, 80 and the universal wheel assembly 82 are actuated and in contact with the deck 38 of the loading dock 32 while the retractable wheel assemblies 84, 86 are withdrawn from contact with the deck 38 in a position close to the undercarriage 74. On the other hand, in a transverse drive and steering operation, such as a repositioning between loading bays at the loading dock 32, the retractable wheel assemblies 84, 86 and the universal wheel assembly 82 are actuated and in contact with the deck 38 while the retractable wheel assemblies 78, 80 are off the deck 38. In particular, during traverse movement operations, the retractable wheel assemblies 78, 80 hydraulically extend and lift the drive wheel assemblies 78, 80 off of the deck 38.

The conveyance subassembly 54 is disposed on the surface 72 of the mobile base 50 to provide a powered transportation path 88 operable for measuring, separating, carrying, and stacking, as required by the application and job assignment of the automatic case loader 10, product from the rear end 66 to the front end 64 proximate to the industrial robot 56. As shown, the powered transportation path 88 includes a powered roller conveyor 90 having roller elements 92 which deliver the product 46 to a landing platform 94 where manipulation by the industrial robot 56 is initiated. It should be appreciated that although only a single powered roller conveyor 90 is display, the powered transportation path 88 may include any combination and type of conveyors, elevators, stackers, and bypasses and the particular combination of components selected for the powered transportation path 84 will depend upon the particular product 46 and application of the automatic case loader 10.

With respect to measuring the product 46, a curtain 96 may form a portion of the conveyance subassembly 54 and be disposed thereon to measure with light the dimensions of the product 46 and forward the measured dimensions to the control subassembly 62 as will be discussed in more detail hereinbelow. It should be appreciated that the automatic case loader 10 may be equipped with further product size detection equipment in addition to the measuring light curtain 96. By way of example, spaced photo-eyes 98 disposed along the conveyance subassembly 54 may measure the product length and determine if any product has non-standard or unacceptable length. As with the dimension data gathered by the curtain 96, the product length data captured by the spaced photo-eyes 98 is supplied to the control subassembly 62.

The conveyance subassembly 54 as well as the telescoping conveyor unit 42 may also each be equipped with a series of end stop photo eyes, such as end stop photo eyes 100, 102, to adjust the rate of automatic flow of product through the telescoping conveyor unit 42 and the conveyance subassembly 54. Such an implementation provides a steady and continuous flow of product, maintains proper product separation, and prevents unnecessary gaps between the product and product backups and jams.

A telescoping conveyor interface 104 couples the roller conveyor 90 of the conveyance subassembly 54 to the telescoping conveyor unit 42 and the rest of a pick belt system which may be at the warehouse associated with the loading dock 32. Auto-follow circuitry associated with the telescoping interface 104 of the telescoping conveyor unit 42 and the conveyance subassembly 54 may utilize fiber optic sensors at the last boom of the telescoping conveyor unit detect reflective tape at the edge of the conveyance subassembly to cause the telescoping conveyor unit 42 to extend and retract to maintain the proper position with respect to the automatic case loader 10.

The industrial robot 56 is disposed at the front end 64 and adapted to provide selective articulated movement of an end effector 130 between the landing platform 94 of the powered transportation path 88 and a reachable space 132 such that the industrial robot 56 is operable to place the product 46 in the reachable space 132. The end effector 130 includes a gripper arm 134 adapted for manipulating product with opposing grapplers 136A, 136B. It should be appreciated that any type of end effector 130 may be employed the industrial robot and the choice of end effector 130 will depend upon the product 46 and specific automatic case loader 10 application. By way of example, the gripper arm 134 with opposing grapplers 136A, 138B is preferred for loading rectangular cases 46A-46H such as cardboard box cases of goods. It should be understood, however, that the product 46 may be any type of good such as tires or other non-cased objects requiring loading.

In one implementation, the industrial robot 56 includes seven segments 130, 138, 140, 142, 144, 146, 148 joined by six joints 150, 152, 154, 156, 158, 160 to furnish selective articulated movement having six degrees of freedom. More particularly, the referenced reachable space 132, as best seen in FIG. 2C, is defined by the movement of the industrial robot 56 which provides rotation about six axes including rotary movement of the entire industrial robot 56 about a primary vertical axis; rotary movement of segment 146 having a tower structure about horizontal axis to provide extension and retraction of the segment 144 having a boom arm; rotary movement of the boom arm about the horizontal axis to provide raising and lowering of the boom arm; and selective rotary movement about three wrist axes.

The positioning subassembly 58 is dispersed throughout the mobile base 50. A distance measurement sensor 170 disposed at the front end 64 of the mobile base 50 measures distance and determines the presence of objects within a detection space 172 which is located in front of the front end 64. In one embodiment, the detection space 172 and the reachable space 132 at least partially overlap. The distance measurement sensor 170 assists the automatic case loader 10 with forward and reverse movement and the repositioning of the automatic case loader 10 to create additional empty reachable space 132 for the placement of the product 46. Further, the distance measurement sensor 170 assists with the coordination and operation of the industrial robot 56. Distance and measurement information gathered by the distance measurement sensor 170 is provided to the control subassembly 62.

As will be discussed in further detail hereinbelow, the distance measurement sensor 170 may be a laser range finding apparatus operating on a time-of-flight measurement basis or principle. It should be appreciated, however, that other types of distance measurements are within the teachings of the present invention. By way of example, and not by way of limitation, the distance measurement sensor may include a laser range finding apparatuses, ultrasonic measurement apparatuses, inclinometers, and combinations thereof. Similar to distance measurement sensor 170, distance measurement sensors 174, 176 are respectively disposed at the sides 68, 70. The distance measurement sensors 174, 176 each include detection spaces (not illustrated) to provide measurement and distance information to the control subassembly 62 during traverse movement operations of the automatic case loader 10.

The safety subsystem 60 is distributed and mounted to the mobile base 50. The safety subsystem 60 may include a light tower 180 which provides a quick indication of the current status of the automatic case loader 10 to an operator 40 and a wireless operator alert system 182 which contacts pagers or cellular devices of individuals through a wireless network. Also a cage and railing 184 may be included around the operator platform 76 to provide additional safety to the operator 40. Emergency buttons, such as emergency button 186, may be located throughout the automatic case loader 10 to provide for instant and immediate power down. Front safety bumpers 188 and rear safety bumpers 190 may be positioned at the front end 64 and the rear end 64 to protect the automatic case loader 10, people, and product during a collision with an obstacle. Additionally, the front safety bumpers 188 and the rear safety bumpers 190 may include detectors that detect the presence of an object and cause an automatic power down during a collision. Side safety bumpers, although not illustrated, may also be utilized. It should be appreciated that other safety features may be integrated into the automatic case loader 10.

The control subassembly 62, which is also distributed and mounted to the mobile base 50, includes control station 192 having a user interface 194 disposed at the side 70 near the operator platform 76. As discussed, the drive subassembly 52, the conveyance subassembly 54, the industrial robot 56, the positioning subassembly 58, and the safety subassembly 60 are interconnected and in communication with the control subassembly 62 via a network of concealed and sheathed cables and wires. With this arrangement, the control subassembly 62 may coordinate the manual and automatic operation of the automatic case loader 10.

Figure 3A:
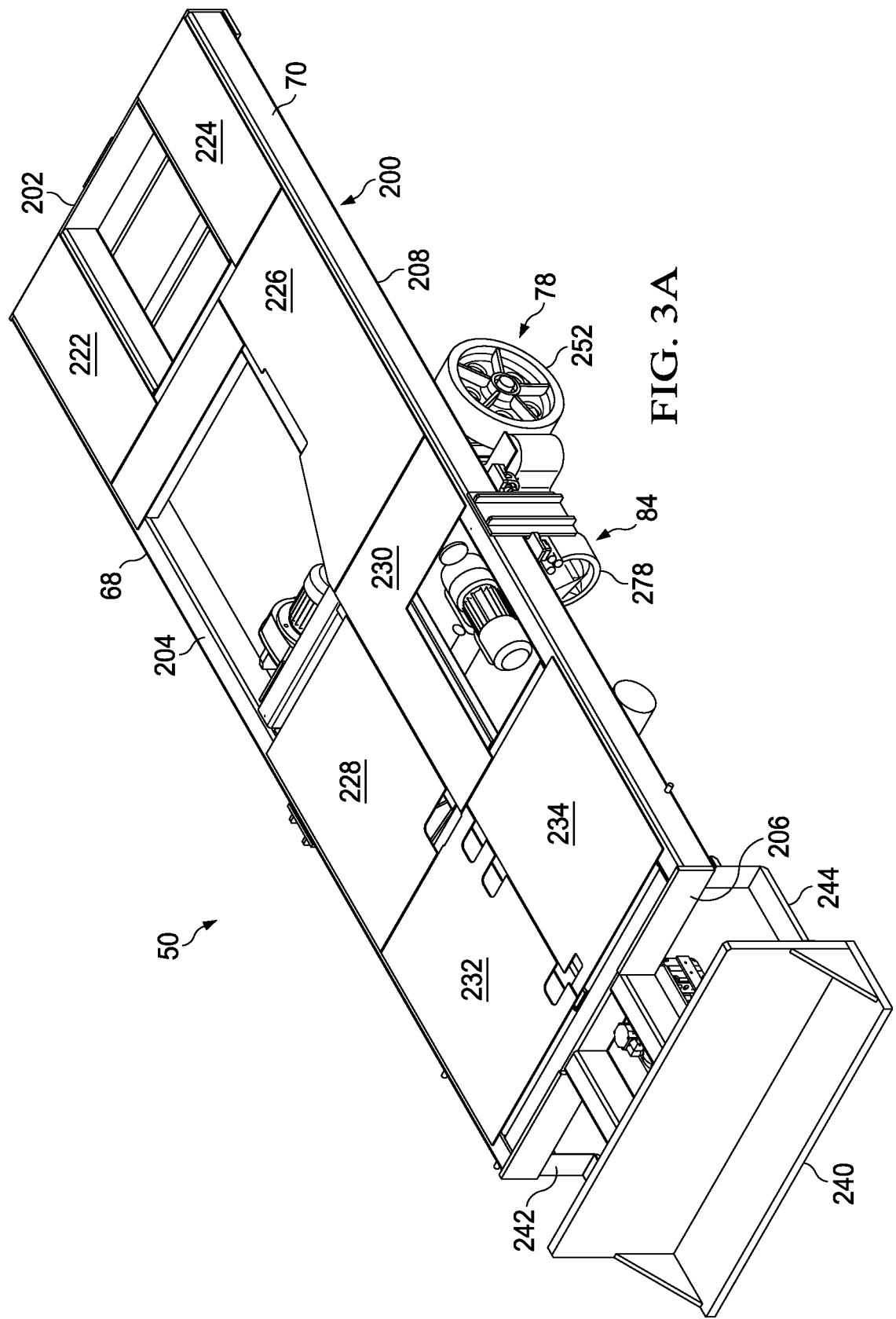
FIG. 3A is a perspective view of a portion of the automatic case loader of FIG. 1 and in particular a detailed view of one embodiment of a mobile base.
Figure 3C:
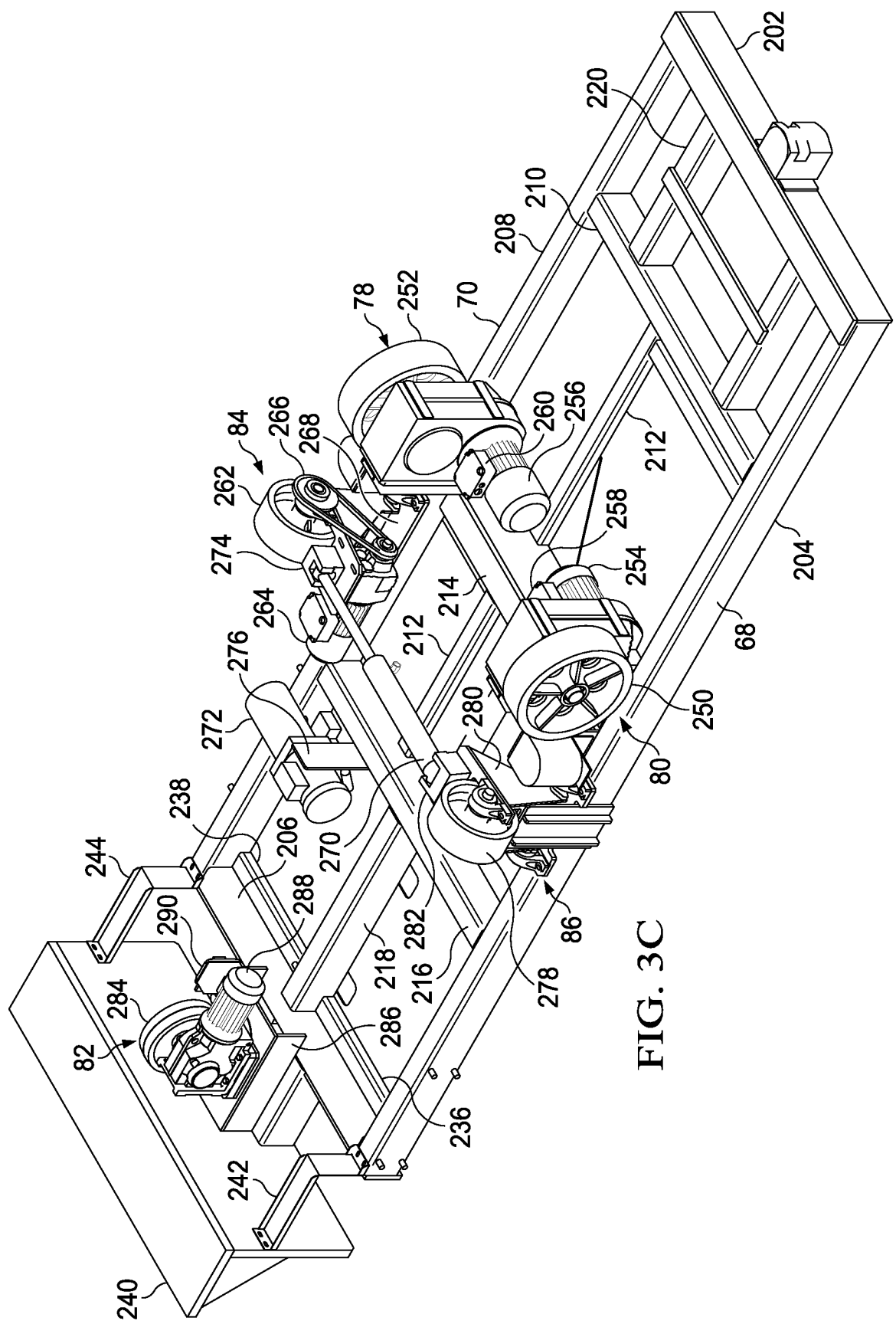
FIG. 3C is a perspective view of an undercarriage of the mobile base illustrated in FIG. 3A.
Figure 4A:
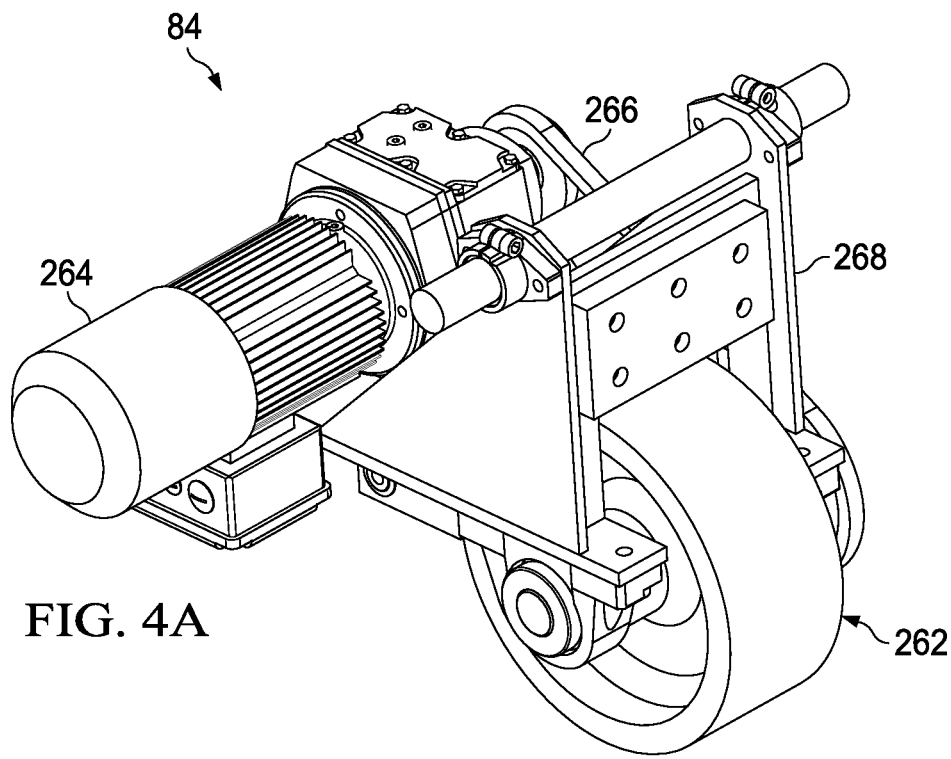
FIG. 4A and FIG. 4B are perspective views of one embodiment of a portion of a retractable wheel assembly which forms a portion of a drive subassembly.
Figure 4B:
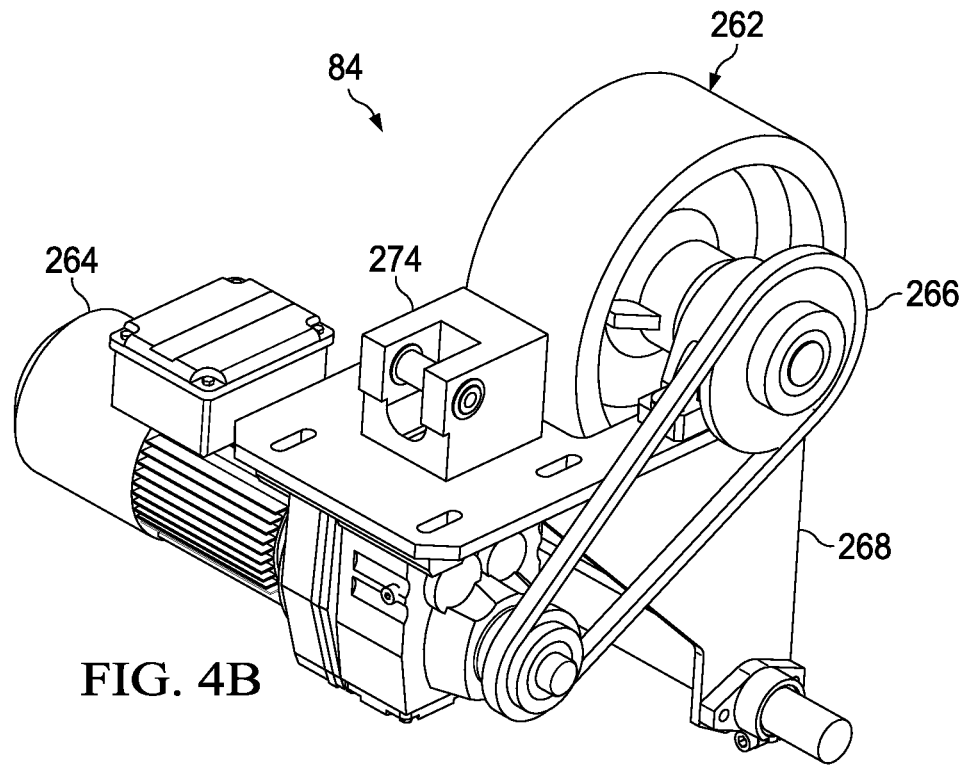
Figure 5:
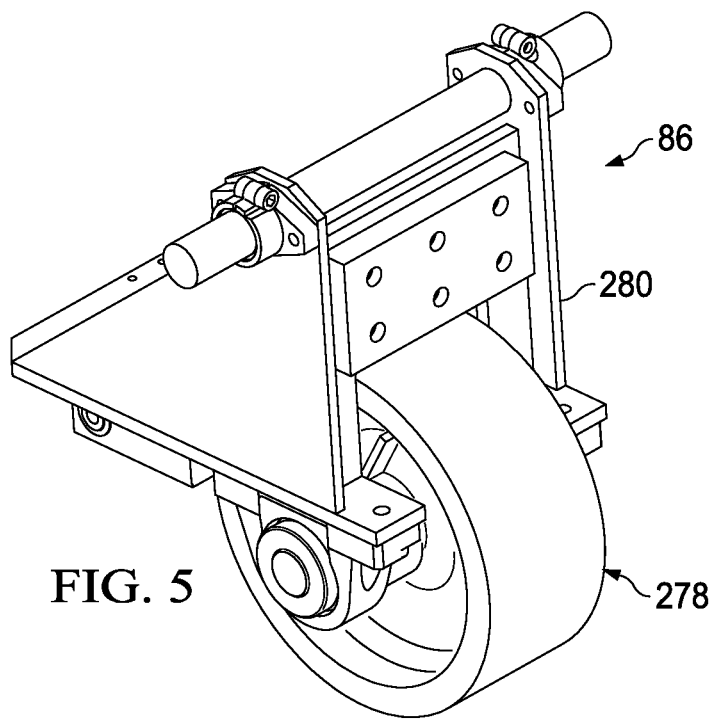
FIG. 5 is a perspective view of one embodiment of another portion of a retractable wheel assembly which forms a portion of a drive subassembly.
Figure 6:
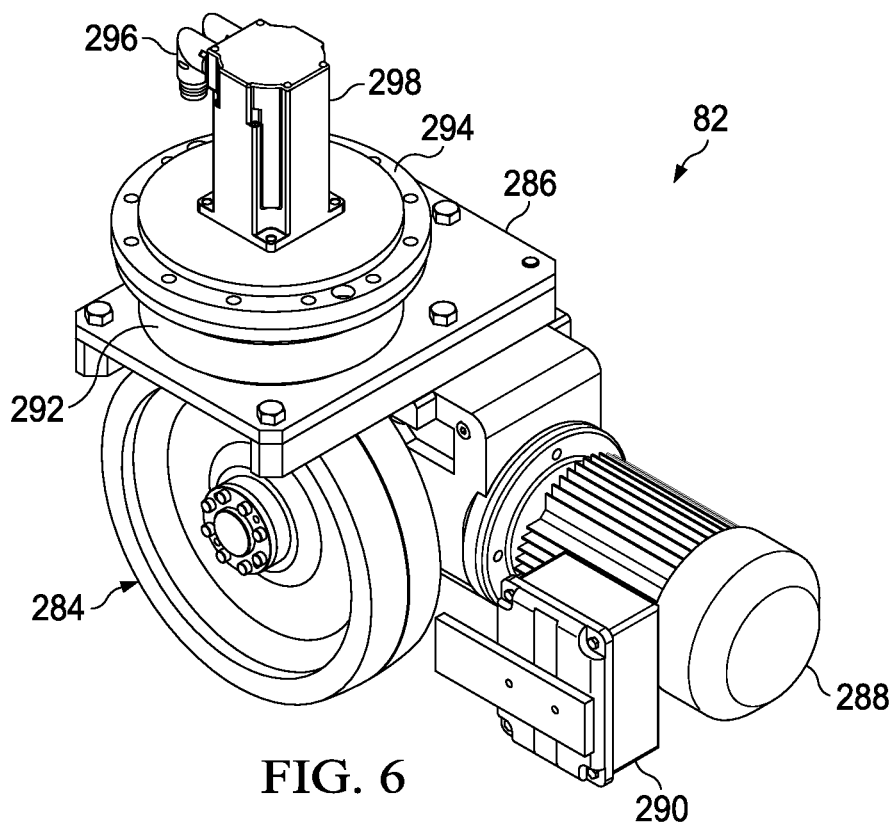
FIG. 6 is a perspective view of one embodiment of a universal wheel assembly which forms a portion of a drive subassembly.

FIG. 3A through FIG. 3C depict the mobile base 50 in further detail. A main frame 200 is constructed of welded steel tubing includes tubular sections 202, 204, 206, and 208 which provide a rectangular framework. The tubular sections 202-208 are supported by tubular sections 208, 210, 214, 216, 218, and 220, which augment and further support the rectangular framework. All mounting plates, such as mounting plates 222, 224, 226, 228, 230, 232, 234, and bolt holes necessary to hold the various components attached to the mobile base 50 are included in the main frame 200. The large plates 228, 230, 232, 234 disposed toward the rear end 66 of the mobile base 50 hold the control station 192 and the user interface 194 in position while providing counter weight for the automatic case loader 10 as well as balance with respect to the industrial robot 56 disposed proximate to the mounting plates 222, 224. Additional counter weight is supplied by tractor weights 236, 238 mounted proximate to the rear end 66, which also serve to add additional support and integrity to the main frame 200. A tray 240 securely coupled to the main frame 200 by mounting brackets 242, 244 at the rear end 66 provides support to the rear safety bumpers 190.

Drive wheel assemblies 78, 80 include a pair of front drive wheels 252, 250 disposed proximate to the front end 64 and, more particularly, proximate the intersection of tubular sections 208, 214 and tubular sections 204, 214, respectively. Respective AC motors 254, 256 with double reduction gearboxes 258, 260 supply power thereto. The AC motor 254 with double reduction gearbox 258 is disposed adjacent to the tubular section 214 and the front drive wheel 250. Similarly, the AC motor 256 with double reduction gearbox 260 is disposed adjacent to the tubular section 214 and the front drive wheel 252.

Referring now to FIGS. 3A through 3C and FIGS. 4A through 4B, the retractable wheel assembly 84 includes a side lift wheel 262 with a drive motor 264 coupled thereto and providing rotational torque through a pulley 266. The side lift wheel 262 and the drive motor 264 are secured to a frame 268 which, in turn, is coupled to the tubular section 208. A hydraulic cylinder 270, under the power of a hydraulic power cylinder 272, is coupled to a crossbar mount 274 disposed on the frame 268. The hydraulic power cylinder 272 is mounted via mounting bracket 276 to the tubular section 216. Referring now to FIGS. 3A through 3C and FIG. 5, the retractable wheel assembly 86 includes a side lift wheel 278 secured via a frame 280 to the tubular section 204. A crossbar mount 282 secures the hydraulic cylinder 270 thereto such that the hydraulic cylinder 270 spans the space between the retractable wheel assemblies 84, 86.

Referring now to FIGS. 3A through 3C and FIG. 6, the universal wheel assembly 82 includes a rear steering wheel 284 mounted to a frame 286 disposed proximate to the rear end 66. An AC motor 288 with a reduction gearbox 290 provides power and is also coupled to the frame 286. Also coupled to the frame 286, a rotational mounting 292 is cooperating with a vertical axis 294 to furnish steering capability. A servomotor 296 attached to a planetary gearbox 298 provides the steering motion.

Returning to FIGS. 3A through 6 to describe the operation of the drive subassembly 52 in conjunction with the mobile base 50, the drive wheel assemblies 78, 80 and universal wheel assembly 82 provide mobility along the length of the automatic case loader 10. The AC motors 254, 256 with the respective double reduction gearboxes 258, 260 drive the front drive wheels 250, 252. In particular, each front drive wheel 250, 252 is independently driven to provide the ability to turn and to provide a pivoting drive mode. The universal wheel assembly 82 provides a rear combination steering and drive wheel 284 that is driven by the AC motor 288 and the gearbox 290. The rear steering wheel 284 spins on the vertical axis 294 to provide enhanced steering capability for the automatic case loader 10.

In addition to providing forward and reverse capability, the drive subassembly 52 furnishes a traverse drive system providing the capability to move the entire automatic case loader 10 perpendicular to a trailer or fixed object at the loading dock 32. During normal operation, the retractable wheel assemblies 84, 86 and particularly the side lift wheels 262, 270 are tucked up under the main frame 200. When traverse mode is activated, the hydraulic cylinder 270 forces the side lift wheels 262, 270 down, lifting the front drive wheels 250, 252 off of the ground. The drive motor 264 provides rotational torque to the side lift wheel 262 while the side lift wheel 278 is passive and follows the side lift wheel 262. In this embodiment, the steering and drive wheel 284 of the universal wheel assembly 82 rotates and provides steering.

Figure 7A:
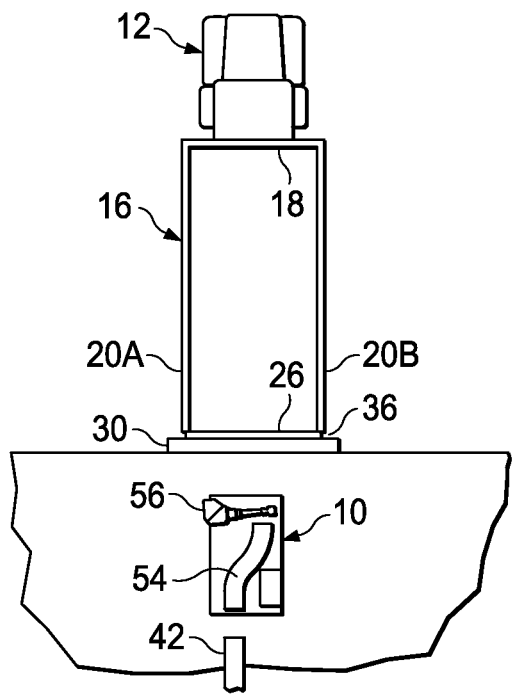
FIGS. 7A through 7H are schematic diagrams of one operational embodiment of the automatic case loader of FIG. 1 stacking standard product depicted as cases of various heights and widths in a trailer of a truck.

Referring now to FIGS. 7A through 7H, wherein one embodiment of an automated loading system and methodology are illustrated for the automatic case loader 10 of the present invention. Initially, as shown in FIG. 7A, the trailer 16 is positioned under the power of the tractor trailer 12 at the loading bay 30 of the loading dock 32 approximate to the deck 38 where the automatic case loader 10 is working. The trailer 16 is set-up, cleaned, and activated in a usual manner. The dock plate 36 is deployed from the loading bay 30 into the trailer 16 to provide a bridge. Thereafter, the trailer 16 is inspected for significant damage that may interfere with the automated loading operations of the automatic case loader 10. Additional inspection may include ensuring the trailer is reasonably centered within the loading bay 30 and ensuring the deck 38 is clear of any obstructions. At this time, by way of further safety measures, a kingpin lockout may be installed to prevent a driver from accidentally pulling out the trailer 16 from the loading bay 30 when the automatic case loader 10 is operating within the trailer 16. The kingpin lockout or similar safety precautions protect both the operator 40 and the equipment and ensures that the wheels of the trailer 16 are chocked and will not roll during the use of the automatic case loader 10.

Continuing to refer to FIG. 7A, once the trailer 16 is positioned in the loading bay 30, the automatic case loader 10 is moved in front of the rear access opening 26 of the trailer 16. The automatic case loader 10 utilizes either a manual or automatic reverse mode to assist the operator 40 in backing the automatic case loader 10 up to the telescoping conveyer unit 42 in a position that is square thereto. The conveyance subassembly 54 of the automatic case loader 10 is then coupled to the telescoping conveyor unit 42. At this time, as the dock plate 36 has been positioned from the deck 38 to the trailer 16, the automatic case loader 10 may be advanced into the interior of the trailer 16.

Figure 7B:
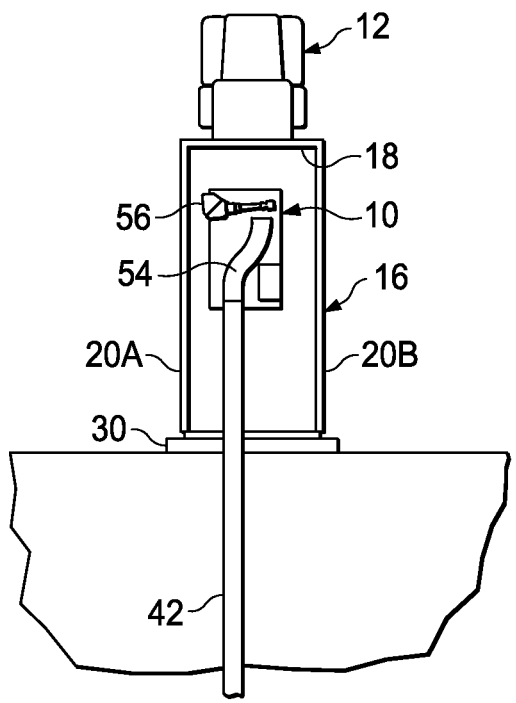

With reference to FIG. 7B, the automatic case loader 10 has advanced forward into the trailer 16 and, in one embodiment, the positioning subassembly 58 and, in particular, the distance measurement sensor 170 continuously determines the position of the automatic case loader 10 within the trailer 16. More specifically, several measurements are made. The position and angle of the automatic case loader 10 are measured with respect to the sidewalls 20A, 20B and an interior width defined thereby. Also, measurements are made with respect to a near wall within the trailer 16 and the floor 22. The near wall being the closer of the front wall 18 of the trailer or the edge formed by product 46, e.g. cases, positioned within the trailer 16. The angle relative to the floor 22 proximate to the automatic case loader 10 is measured as the automatic case loader traverses the dock plate 36 and moves into the trailer 16. In one embodiment, following successful traversal, the angle relative to the floor 22 may be assumed to be constant.

In this way, as the automatic case loader 10 moves, the position of the automatic case loader 10 relative to objects in its environment is known and the automatic case loader 10 may adjust operation appropriately. Adjustments in operation may include, but are not limited to, the operation of the industrial robot 56, the operation of the conveyance subassembly 54, and the actuation of the drive subassembly 52. The position of the sidewalls 20A, 20B and the near wall is utilized to determine the position of the automatic case loader 10 along the length of the trailer 16, the position across the width of the trailer 16, and the automatic case loader's angle relative to the sidewalls 20A, 20B or yaw. The measurements also determine the position of the automatic case loader 10 relative to the floor 22 of the trailer 16. To assist the automatic case loader 10 in determining position within the trailer 16, in one implementation, the automatic case loader 10 is programmed with the dimensions of the trailer 16.

Figure 7C:
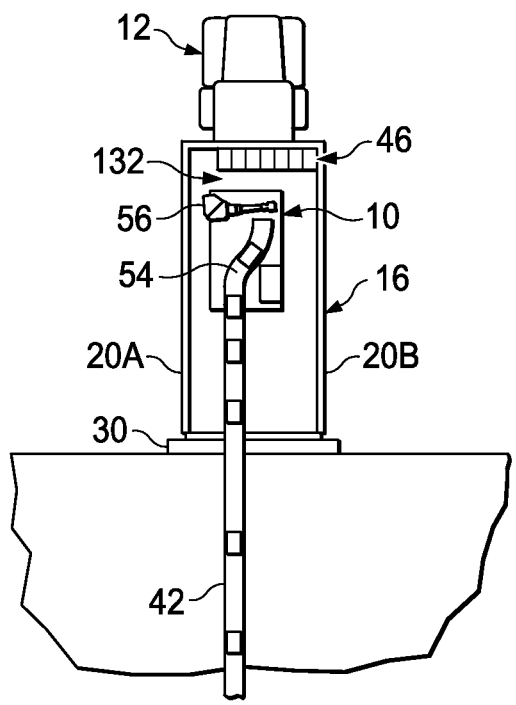

Additionally, in one embodiment, the automatic case loader 10 is programmed with the reachable space 132 of the industrial robot 56. As illustrated, once the automatic case loader is positioned proximate to the front wall 18 of the trailer 16 such that the placement of product 46 against the front wall 18 of the trailer 16 is within the reachable space 132 of the industrial robot 56, the automatic case loader 10 stops advancing. Referring now to FIG. 7C, product 46 is conveyed from the telescoping conveyor unit 42 to the conveyance subassembly 54 and this stream of product 46 is presented to the industrial robot 56. With selective articulated movement through the reachable space 132, the industrial robot 56 places the product 46 within the trailer and sequentially loads the product 46 according to a stacking routine designed to optimize the use of available space within the trailer 16.

In one embodiment, this stacking routine places product in sequentially vertically stacked horizontal rows. By way of example, FIG. 7C illustrates a first stacked horizontal row being completed. This stacking routine or other alternative stacking routine may be optimized for the size of the end effector 130 of the industrial robot 56, the dimensions of the trailer 16, and the dimensions of the product 46.

Figure 7D:
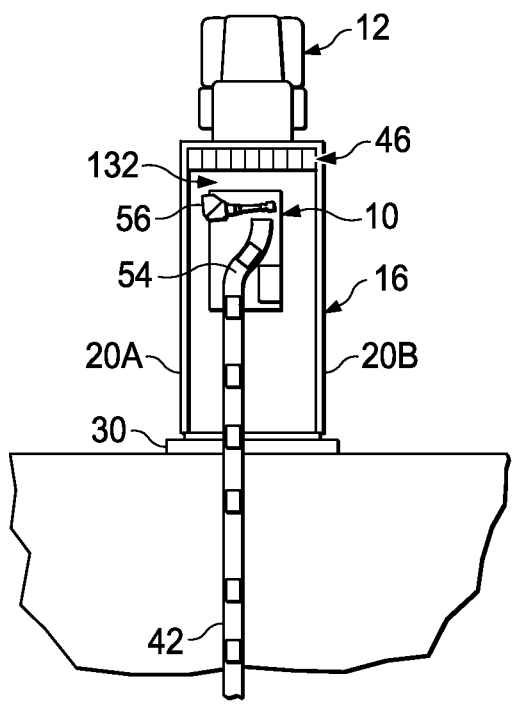

As depicted in FIG. 7D, the automatic case loader 10 has completed stacking a second horizontal row of product 46 on top of the first horizontal row of product 46. The loading of the product 46 by the industrial robot 56 is temporarily interrupted in response to the distance measurement sensor 170 detecting the presence of the product 46 within the reachable space 132. Further, with this information being available to the control subassembly 62, a signal may be sent to the conveyance subassembly 54 to slow down or temporarily halt the powered transport of the product 46.

Figure 7E:
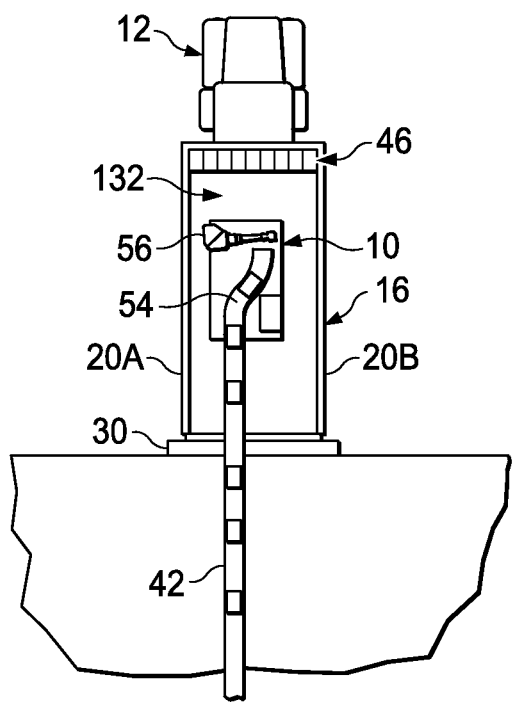

Referring now to FIG. 7E, the automatic case loader 10 has reversed and repositioned to refresh the reachable space 132 such that the automatic case loader 10 is positioned proximate to the wall of placed product 46 in order that the placement of additional product 46 against the wall of placed product 46 is within the reachable space 132 of the industrial robot 56. During the repositioning of the automatic case loader 10, the telescoping conveyor unit 42 appropriately retracts, while maintaining contact with the conveyance subassembly 54, to accommodate the new position of the automatic case loader 10.

Figure 7F:
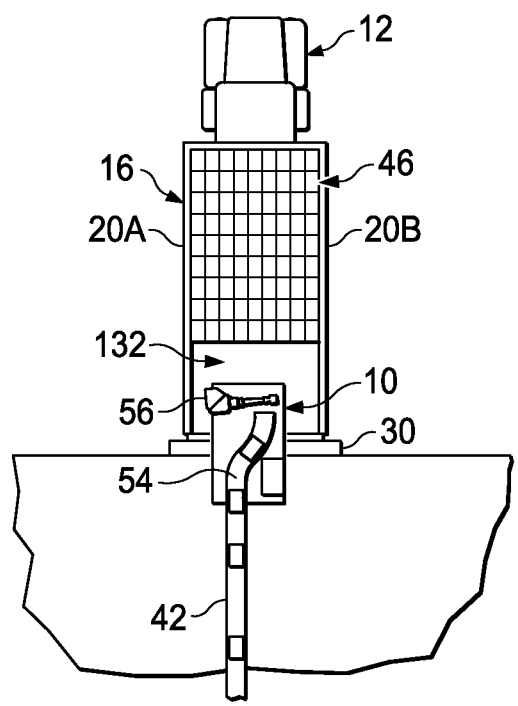
Figure 7G:
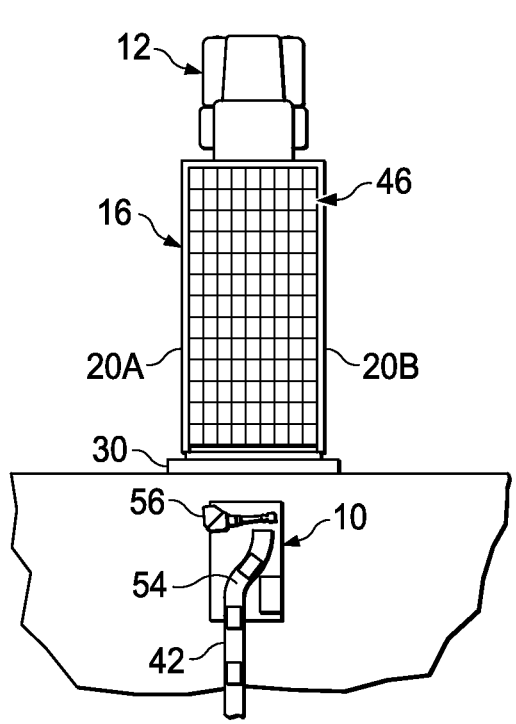
Figure 7H:
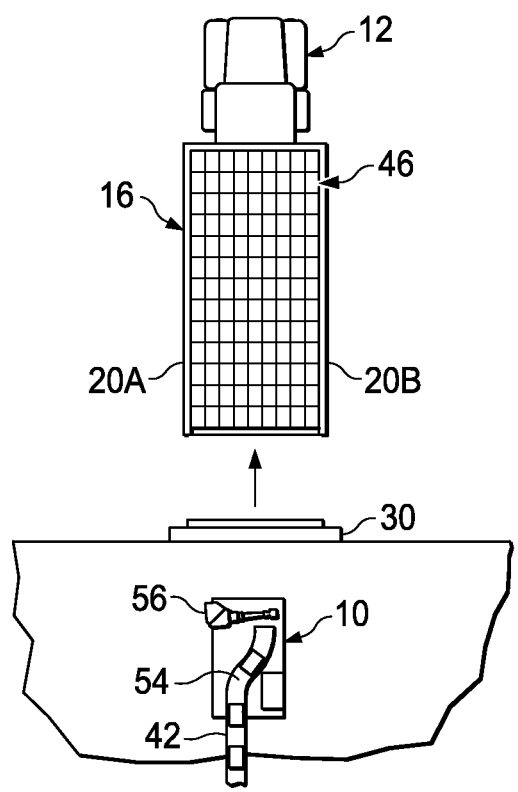

Referring to FIG. 7F, the iterative stacking operations and repositioning of the automatic case loader 10 described in FIGS. 7C through 7E continues and the trailer 16 is filled. With respect to FIG. 7G, the trailer 16 is completely filled with product 46 and the automatic case loader 10 is reversed to a position entirely on the deck 38. Thereafter, as shown in FIG. 7H, the trailer 16 filled with product 46 leaves the loading dock 32. A fresh empty trailer may then be positioned at the loading bay 30 and loaded in the manner described herein.

FIG. 8 depicts one embodiment of the automatic case loader 10 and the control signals associated therewith. The illustrated components coordinate the various functions and operations of the automatic case loader 10. The user interface 194, operational environment database 350, programmable logic controller 352, robot controller 354, and distance measurement sensors 170, 174, 176 are interconnected. The drive subassembly 52, conveyance subassembly 54, as represented by control 356 for conveyors/elevators, and safety controller 358 are connected to the programmable logic controller 352. Finally, the industrial robot 56 is connected to the robot controller 354. In one implementation, the user interface 194, operational environment database 350, and programmable logic controller 352 are part of the control subassembly 62 and the robot controller 354 forms a portion of the industrial robot 56. The safety controller 358 is included in the safety subsystem 60 and provides operation to the aforementioned components of this subsystem.

The user interface 194 provides user control and interaction with the automatic case loader 10. The user interface 194 may utilize icons in conjunction with labels and/or text to provide navigation and a full representation of the information and actions available to the operator. In addition to loading operations, user interactions may be related to maintenance, repair and other routine actions which keep the automatic case loader 10 in working order or prevent trouble from arising.

The operational data environment database 350 includes data about the reachable space 132 of the industrial robot 56, stacking methodology data, product information as well as information about the standard sizes of trailers. The product information may be stored in the operational data environment database 350, gathered by the conveyance subassembly 54 as previously discussed, or gained by a combination thereof. By having the standard sizes of trailers pre-loaded, operator time is saved from having to enter this data and performance of the automatic case loader 10 is improved with this additional information. By way of example, Tables I & II present exemplary examples of type of trailer data that the automatic case loader 10 may utilize in determining position and product placement.

TABLE I

TRAILER DIMENSIONS

| Trailer Type | Length | Inside Width | Inside Height Center | Inside Height Front | Door Opening Width |
|---|---|---|---|---|---|
| 28' (8.5 m) High Cube | 27'3" (8.3 m) | 100" (2.5 m) | 109" (2.8 m) | 107" (2.7 m) | 93" (2.4 m) |
| 45' (13.7 m) Wedge | 44'1½" (13.4 m) | 93" (2.4 m) | 109" (2.8 m) | 106" (2.7 m) | 87" (2 m) |
| 48' (14.6 m) Wedge | 47'3" (14.4 m) | 99" (2.5 m) | 110½" (2.8 m) | 108½" (2.8 m) | 93" (2.4 m) |

TABLE II

TRAILER DIMENSIONS CONTINUED

| Trailer Type | Door Opening Height | Rear Floor Height | Cubic Capacity | Overall Width | Overall Height |
|---|---|---|---|---|---|
| 28' (8.5 m) High Cube | 104" (2.6 m) | 47½" (1.2 m) | 2029 cft (57.5 cm) | 102" (2.6 m) | 13'6" (4.1 m) |
| 45' (13.7 m) Wedge | 105½" (2.7 m) | 50" (1.3 m) | 3083 cft (7.3 cm) | 96" (2.4 m) | 13'6" (4.1 m) |
| 48' (14.6 m) Wedge | 105" (2.7 m) | 48½" (1.2 m) | 3566 cft (101 cm) | 102" (2.6 m) | 13'6" (4.1 m) |

The programmable logic controller 352 coordinates overall operation and switches between various modes of operation including manual and automatic. The programmable logic controller 352 also provides for the high-level calculation and coordination required during automatic operation for items such as the stack height during loading and steering angel calculations during automatic navigation.

The robot controller 354 controls the motions of the industrial robot 56 through built in inputs and outputs wired through the industrial robot 56 and the end effector 130. It should be appreciated that although a particular architecture is presented for the control of the automatic case loader, other architectures are within the teachings of the present invention. By way of example, any combination of hardware, software, and firmware may be employed. By way of further example, the distribution of control may differ from that presented herein.

In one operation embodiment, the programmable logic controller 352 accesses the dimensions of the trailer 16 from the operational environment database 352. The operator 40 has indicated through the user interface 194 which type of trailer has arrived at the docking bay 30. Alternatively, the distance measurement sensor 170 is operable to detect this information. The distance measurement sensors 170, 174, 176 relay distance and position data to the programmable logic controller 352 which uses this information to send control signals to the robot controller 354, the drive subassembly 52, the controller 352, and the safety controller 358. Additionally, the programmable logic controller 352 receives control signals, which are inputs into the behavior process, from each of these components. Constant updates and status information are provided to the operator 40 by the programmable logic controller 352 through the user interface 194.

Figure 9:
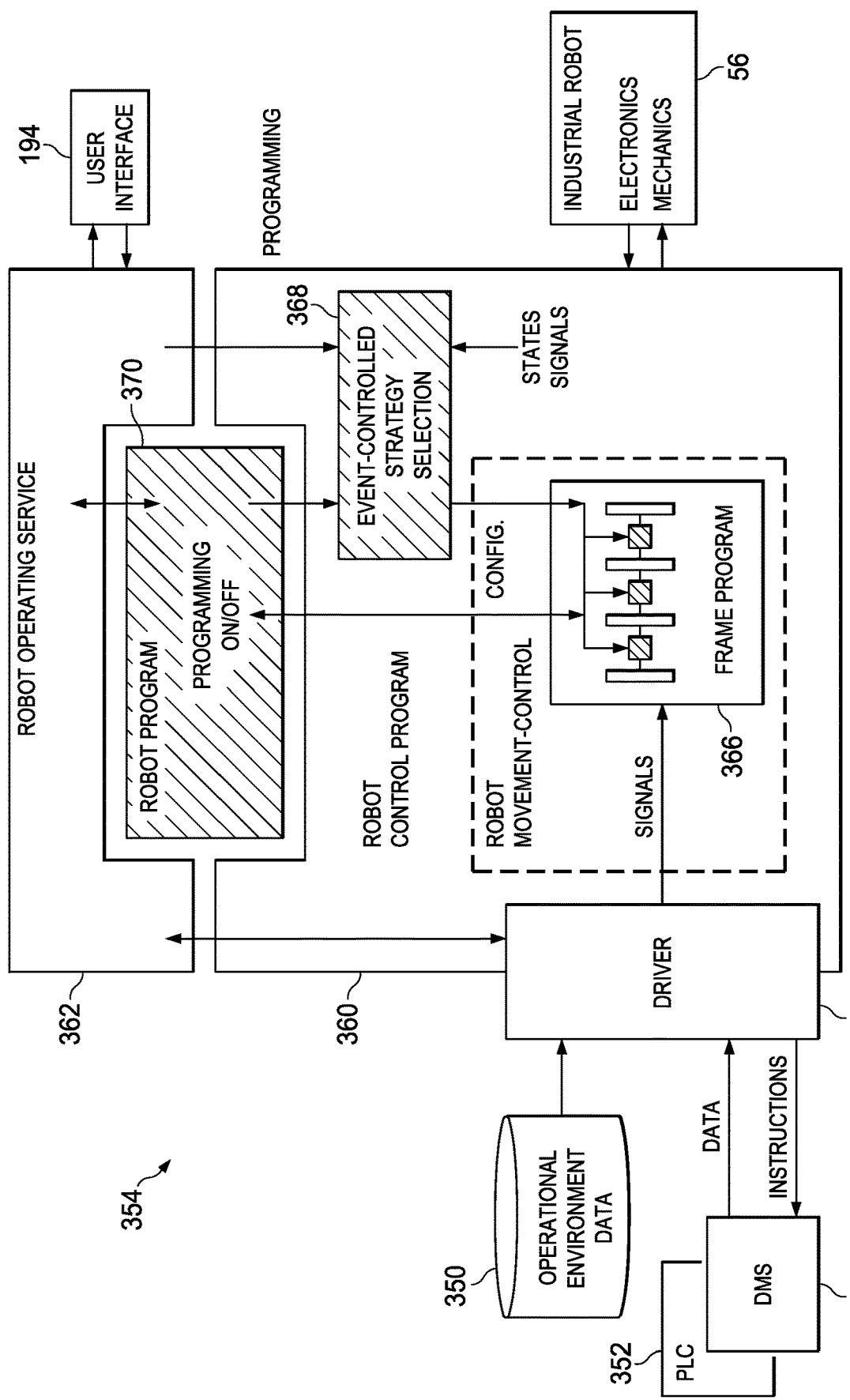
FIG. 9 is a schematic diagram of one embodiment of a robot controller which forms a portion of the automatic case loader.

FIG. 9 depicts one embodiment of the robot controller 354 which forms a portion of the automatic case loader 10. The essence of the robot control 352 is a robot system or control program 360, which controls the industrial robot 56. The control program 360 can be operated by the operator 40 by means of an operating service 362 in communication with the user interface 194 and receives input data (as well as provide instructions, as appropriate) from the operational environmental database 350, programmable logic controller 352, and distance measurement sensor 170 by means of a driver 364. It should be appreciated, that the independence of the robot controller 354 may vary. In one implementation, the robot controller 354 may be under the control of the programmable logic controller 352. In another implementation, as illustrated, the robot controller 354 is more autonomous and may include features such as direct connection to the user interface 194.

According to one embodiment, between the driver 364 and the control program 360 is provided an independent data processing layer in the form of a frame program 366, which controls the robot movements, and a unit 368 for automated or event-controlled strategy or behavioral selection on the basis of the states and signals which occur. User application programs, event-controlled strategy selections and sensor programs in the frame program 366 can be programmed by the operator 40 and directed by a robot program 370, which monitors the balance and implementation of manual and automatic control of the industrial robot 56.

FIG. 10 depicts one embodiment of a distance measurement sensor, i.e., a laser measurement sensor 380. A staging circuit 382 causes a pulsed laser 384 to transmit light pulses while causing the rotation of a light deflecting device 386 via controller 388 which may be equipped with a rotational means and a motor. The angular position of the light deflecting device 386 is continuously communicated to the staging circuit 382 by the controller 388. Light pulses are transmitted into the detection space 172 via the transmitter lense and the mirrors associated with the light deflection device 386. More particularly, when the rotary mirror of the light deflection device 386 is driven by the controller 388 to execute a continuous rotary movement, the staging circuit 382 causes the pulsed laser 384 to transmit a light pulse. The light pulse is transmitted into the detection space 172 and is reflected from an object, so that finely a received pulse enters into a photo receiving arrangement 390. In this manner the light reaches the photo receiver arrangement 390 after a light transit time t of 2d/c, where d is the space in the object from the apparatus and c is the speed of light.

The time t between the transmission and reception of the light pulse is measured with the aid of a comparator 392 having time interval computer functionality. On transmitting the light pulse, a counter function within the comparator 392 is triggered and is stopped again by the photo receiver arrangement 390 via the comparator 392 on receiving the light pulse from the detection space 172.

A corresponding electrical signal is formed and applied via comparator 392 to a laser scanner controller 394, signal to noise processor 396 and a detector 398, which analyzes the signal for objects and in the instant example determines that an object is present. The task of the signal to noise processor 396 is to control the detection threshold independence on the received noise level. This control ensures a constant false alarm rate with varying illumination situations and object reflection factors. The signal to noise processor 396 makes available this information to the laser scanner controller 394. The laser scanner controller 394 performs peak value calculations based on the data from the comparator 392, the signal to noise processor 396, and the detector 398.

As the laser scanner controller 394 knows the instantaneous angular position of the light pulses by way of communication with the staging circuit 382, the laser scanner controller 394 determines the location of the object and other navigational properties. The laser scanner controller 394 is adapted to forward this information to other components.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. An automatic case loader for loading product in a trailer, the automatic case loader comprising:
   a base;
   an industrial robot disposed on the base, the industrial robot providing selective articulated movement of an end effector between a powered transportation path having product and a reachable space such that the industrial robot is operable to place the product in the reachable space;
   a distance measurement sensor disposed at the base, the distance measurement sensor for determining presence of objects within a detection space, wherein the detection space and the reachable space at least partially overlap; and a control subassembly mounted at the base, the control subassembly being in communication with the industrial robot and the distance measurement sensor, the control subassembly coordinating the selective articulated movement of the industrial robot based upon the distance measurement sensor detecting objects within the detection space, dimensions of the trailer provided to the control subassembly, and dimensions of the product provided to the control subassembly.

2. The automatic case loader as recited in claim 1, wherein at least one of the distance measurement sensor and the control subassembly is at least partially integrated into the industrial robot.

3. The automatic case loader as recited in claim 1, wherein the industrial robot comprises seven segments joined by six joints to furnish selective articulated movement having six degrees of freedom.

4. The automatic case loader as recited in claim 1, wherein the end effector comprises a gripper arm adapted for manipulating product with opposing grapplers.

5. The automatic case loader as recited in claim 1, wherein the distance measurement sensor comprises a laser range finding apparatus operating on a time-of-flight measurement principle.

6. The automatic case loader as recited in claim 1, wherein the distance measurement sensor comprises a device selected from the group consisting of laser range finding apparatuses, ultrasonic measurement apparatuses, inclinometers, and combinations thereof.

7. The automatic case loader as recited in claim 1, wherein at least one of the dimensions of the trailer and the dimensions of the product are programmed into the control subassembly.

8. An automatic case loader for loading product in a trailer, the automatic case loader comprising:
  a base;
  an industrial robot disposed on the base, the industrial robot providing selective articulated movement of an end effector between a powered transportation path having product and a reachable space such that the industrial robot is operable to place the product in the reachable space;
  a distance measurement sensor disposed at the base, the distance measurement sensor for determining presence of objects within a detection space, wherein the detection space and the reachable space at least partially overlap; and
  a control subassembly mounted at the base, the control subassembly being in communication with the industrial robot and the distance measurement sensor, the control subassembly coordinating the selective articulated movement of the industrial robot based upon the distance measurement sensor detecting objects within the detection space and dimensions of the trailer provided to the control subassembly.

9. The automatic case loader as recited in claim 8, wherein at least one of the distance measurement sensor and the control subassembly is at least partially integrated into the industrial robot.

10. The automatic case loader as recited in claim 8, wherein the industrial robot comprises seven segments joined by six joints to furnish selective articulated movement having six degrees of freedom.

11. The automatic case loader as recited in claim 8, wherein the end effector comprises a gripper arm adapted for manipulating product with opposing grapplers.

12. The automatic case loader as recited in claim 8, wherein the distance measurement sensor comprises a laser range finding apparatus operating on a time-of-flight measurement principle.

13. The automatic case loader as recited in claim 8, wherein the distance measurement sensor comprises a device selected from the group consisting of laser range finding apparatuses, ultrasonic measurement apparatuses, inclinometers, and combinations thereof.

14. The automatic case loader as recited in claim 8, wherein the dimensions of the trailer are programmed into the control subassembly.

15. An automatic case loader for loading product in a trailer, the automatic case loader comprising:
  a base;
  an industrial robot disposed on the base, the industrial robot providing selective articulated movement of an end effector between a powered transportation path having product and a reachable space such that the industrial robot is operable to place the product in the reachable space;
  a distance measurement sensor disposed at the base, the distance measurement sensor for determining presence of objects within a detection space, wherein the detection space and the reachable space at least partially overlap; and
  a control subassembly mounted at the base, the control subassembly being in communication with the industrial robot and the distance measurement sensor, the control subassembly coordinating the selective articulated movement of the industrial robot based upon the distance measurement sensor detecting objects within the detection space and dimensions of the product provided to the control subassembly.

16. The automatic case loader as recited in claim 15, wherein at least one of the distance measurement sensor and the control subassembly is at least partially integrated into the industrial robot.

17. The automatic case loader as recited in claim 15, wherein the industrial robot comprises seven segments joined by six joints to furnish selective articulated movement having six degrees of freedom.

18. The automatic case loader as recited in claim 15, wherein the end effector comprises a gripper arm adapted for manipulating product with opposing grapplers.

19. The automatic case loader as recited in claim 15, wherein the distance measurement sensor comprises a laser range finding apparatus operating on a time-of-flight measurement principle.

20. The automatic case loader as recited in claim 15, wherein the distance measurement sensor comprises a device selected from the group consisting of laser range finding apparatuses, ultrasonic measurement apparatuses, inclinometers, and combinations thereof.

21. The automatic case loader as recited in claim 15, wherein the dimensions of the product are programmed into the control subassembly.

* * * * *